United States Patent
Reeve et al.

(10) Patent No.: US 11,880,296 B2
(45) Date of Patent: Jan. 23, 2024

(54) GENERATING A TEST CLUSTER FOR TESTING A CONTAINER ORCHESTRATION SYSTEM

(71) Applicant: International Business Machines Corporation, Armonk, NY (US)

(72) Inventors: John Anthony Reeve, Winchester (GB); Emily Lucy Maryon, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 17/449,858

(22) Filed: Oct. 4, 2021

(65) Prior Publication Data

US 2023/0105203 A1  Apr. 6, 2023

(51) Int. Cl.
*G06F 11/00* (2006.01)
*G06F 11/36* (2006.01)
*G06F 16/27* (2019.01)

(52) U.S. Cl.
CPC ........ *G06F 11/368* (2013.01); *G06F 11/3684* (2013.01); *G06F 16/27* (2019.01)

(58) Field of Classification Search
CPC ..... G06F 11/368; G06F 11/3684; G06F 16/27
See application file for complete search history.

(56) References Cited

U.S. PATENT DOCUMENTS

| | | | |
|---|---|---|---|
| 7,003,445 B2 * | 2/2006 | Humphreys | G06F 40/56 704/7 |
| 10,326,655 B1 | 6/2019 | Sait et al. | |
| 10,908,999 B2 | 2/2021 | Natanzon et al. | |
| 2006/0156287 A1 * | 7/2006 | Vikram | G06F 11/3684 717/124 |
| 2009/0210749 A1 * | 8/2009 | Hayutin | G06F 11/368 714/38.1 |
| 2018/0357145 A1 * | 12/2018 | Sarangapani | G06F 8/51 |

FOREIGN PATENT DOCUMENTS

CN    115934244 A    4/2023

OTHER PUBLICATIONS

Anonymous, "Dynamic hierarchical provisioning mechanism," an IP.com Prior Art Database Technical Disclosure, IP.com No. IPCOM00211768D, Oct. 17, 2011, 6 pgs.

(Continued)

*Primary Examiner* — Joshua P Lottich
(74) *Attorney, Agent, or Firm* — Kelsey M. Skodje

(57) ABSTRACT

A method, system, and computer program product for testing a container orchestration system are disclosed. The method includes replicating objects of a production cluster by extracting an object definition from an object and transforming the object definition to create a replicated object definition with an equivalent syntactic form. The replicated object definition requires fewer resources than the object definition. The method also includes applying the replicated objects of the production cluster to a simplified test cluster that replicates a configuration of the production cluster in a scaled down form. Additionally, the method includes testing, with the simplified test cluster, an upgraded version of the container orchestration system.

20 Claims, 7 Drawing Sheets

(56) References Cited

OTHER PUBLICATIONS

Anonymous, "Integrated Architecture Framework to Optimize Deployment Process," https://priorart.ip.com/IPCOM/000264508, an IP.com Prior Art Technical Disclosure, IP.com No. IPCOM000264508D, Dec. 30, 2020, 8 pgs.

Anonymous, "Kubernetes Autoscaler," https://github.com/kubernetes/autoscaler, printed Aug. 12, 2021, 2 pgs.

Anonymous, "kubetest2," https://github.com/kubernetes-sigs/kubetest2, printed Aug. 12, 2021, 2 pgs.

Anonymous, "Method of Replicating Configuration of Distribution System in Cloud Environment," https://priorart.ip.com/IPCOM/000264140, an IP.com Prior Art Technical Disclosure, IP.com No. IPCOM000264140D, Nov. 14, 2020, 3 pgs.

Anonymous, "Process for migrating a solution to a new version of a platform while maintaining the solution in production on an existing platform," https://priorart.ip.com/IPCOM/000236010, an IP.com Prior Art Database Technical Disclosure, IP.com No. IPCOM000236010D, Apr. 2, 2014, 6 pgs.

Anonymous, "Regression tests in SaaS environment based on inter-component communication synchronization," https://priorart.ip.com/IPCOM/000239501, an IP.com Prior Art Database Technical Disclosure, IP.com No. IPCOM000239501D, Nov. 12, 2014, 5 pgs.

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

GENERATING A TEST CLUSTER FOR TESTING A CONTAINER ORCHESTRATION SYSTEM

BACKGROUND

The present disclosure relates to container orchestration systems, and more specifically, to testing container orchestration systems.

Complex applications can be decomposed into independent parts, referred to as "microservices", that cooperate via messaging. Containers are used for deploying microservices of applications in the cloud. Multiple containers can be run or "orchestrated" together so that each container runs a separate microservice and the combined set of microservices represents a complete application. Container orchestration systems can take the form of cluster management systems which manage clustered groups of hosts in the form of physical or virtual machines running containers.

SUMMARY

Various embodiments are directed to a method of testing a container orchestration system. The method includes replicating objects of a production cluster by extracting an object definition from an object and transforming the object definition to create a replicated object definition with an equivalent syntactic form. The replicated object definition requires fewer resources than the object definition. The method also includes applying the replicated objects of the production cluster to a simplified test cluster that replicates a configuration of the production cluster in a scaled down form. Additionally, the method includes testing, with the simplified test cluster, an upgraded version of the container orchestration system.

In some embodiments, the method includes detecting a new object in the production cluster, extracting a new object definition from the new object, transforming the new object definition to create a new replicated object definition, and applying a replicated object having the new replicated object definition to the simplified test cluster. The production cluster can be monitored for new objects. Transforming the object definition can include modifying the object definition using a set of rules that depend on an object type. In some embodiments, transforming the object definition includes scaling back required resources to minimum values required for operation of the object. The object can be a deployment object. In these instances, transforming the object definition can include scaling down a deployment to one replica, changing a deployment image to a simple mock operating system and application with no running code and minimum resources, changing a deployment image to an alternative image for running selective aspects of a container to check configuration, or simplifying checks. In some embodiments, the alternative image is configurable by a user to test selected functionality.

Further embodiments are directed to a system, which includes a memory and a processor communicatively coupled to the memory, wherein the processor is configured to perform the method. Additional embodiments are directed to a computer program product, which includes a computer readable storage medium having program instructions embodied therewith, the program instructions executable by a processor to cause a device to perform the method.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

DETAILED DESCRIPTION

Figure 1:
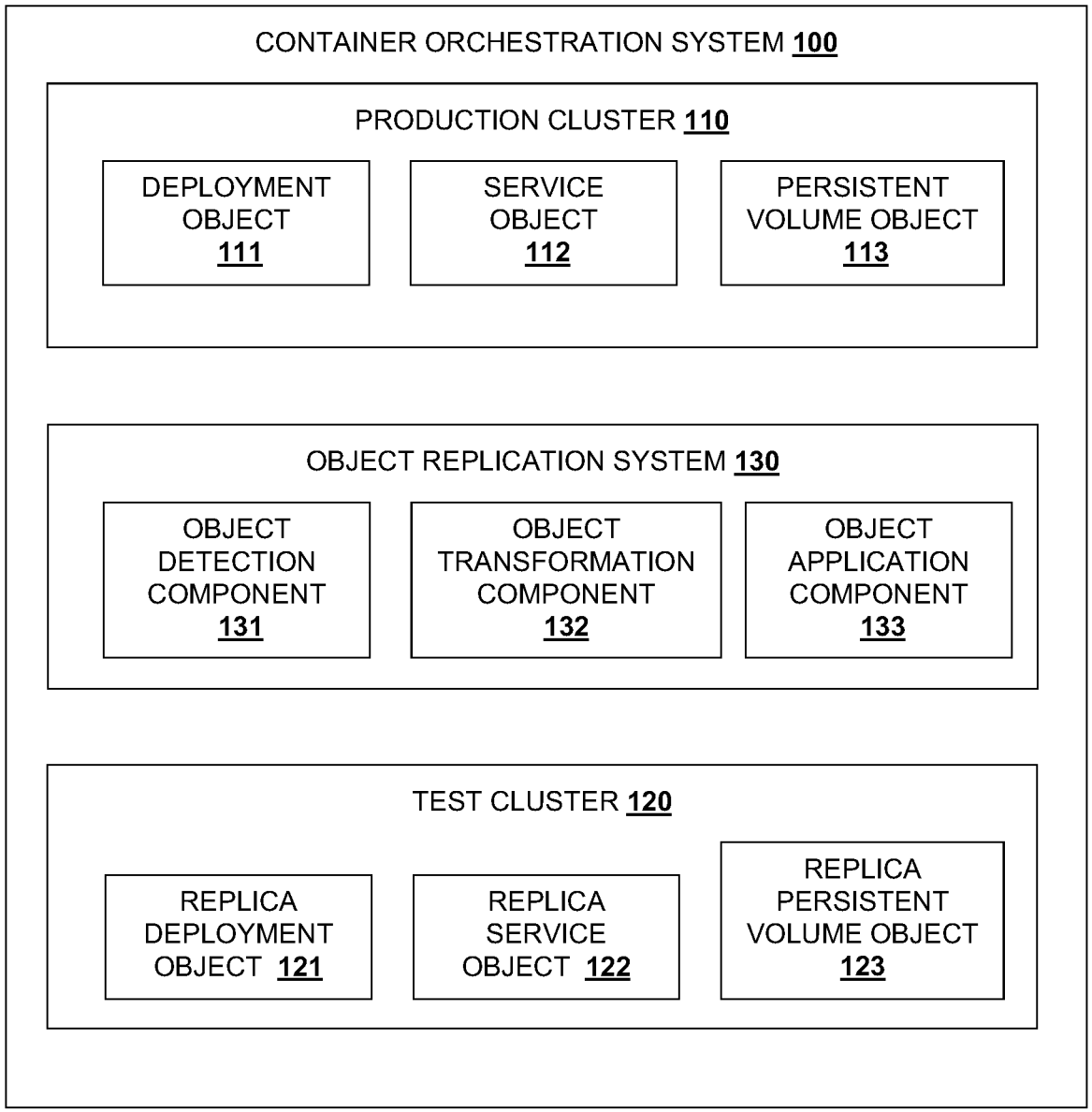
FIG. 1 is a block diagram illustrating a container orchestration system, according to some embodiments of the present disclosure.

Aspects of the present disclosure relate generally to the field of container orchestration systems and, in particular, to testing container orchestration systems. While the present disclosure is not necessarily limited to such applications, various aspects of the disclosure may be appreciated through a discussion of various examples using this context.

Complex applications can be decomposed into independent parts, referred to as "microservices", that cooperate via messaging, and the combined set of microservices can represent a complete application.

Containers can be used for deploying microservices of applications in the cloud. Containers may offer advantages over technologies like virtual machines because containers can be more portable, quicker to start and stop, and more compatible with continuous integration and continuous delivery (CI/CD) systems. Multiple containers can be run or "orchestrated" together, where each container runs a separate microservice and the combined set of microservices represents a complete application. For example, Kubernetes® (Kubernetes is a trademark of The Linux Foundation) is an open-source container orchestration system for automating application deployment, scaling, and management.

When the number of containers increases substantially, container orchestration systems can be required, particularly in CI/CD systems. Container orchestration systems can provide automated systems for managing, scheduling, networking, and monitoring containers. Container orchestration systems can allow application services to be built that can span multiple containers, schedule containers across a cluster, scale those containers, and manage their health over time.

Container orchestration systems can take the form of cluster management systems, which can manage clustered groups of hosts in the form of physical or virtual machines running containers. Clusters may span hosts across public, private, and hybrid clouds.

In container orchestration systems, there can be a rapidly changing ecosystem, with frequent updates to add new features and capabilities, often with a large number of breaking changes. Within such systems, there are a variety of resource types that may come together to form an environment, which can rely on complicated links between the resource types. The groups of containers being run inside the cluster often also depend on other external services, such as databases or logging platforms.

It can be almost impossible to reverse a container orchestration system migration once finished. Therefore, testing done before upgrading a container orchestration system can be very valuable. When a user is planning to move a production cluster to a higher version of a container orchestration system, the user may do a test upgrade on a development cluster. However, the development clusters, if broken, may have a large impact on the productivity of developers. Additionally, development clusters are often less complicated than what is running in a production cluster, meaning there can be a gap in what can be tested on them and safely applied to a production cluster.

Disclosed herein are techniques for generating test clusters that can be used to test container orchestration systems. In some embodiments, objects of a production cluster are replicated by extracting an object definition from each object and transforming the object definition to create a replicated object definition that has an equivalent syntactic form and that requires fewer resources and/or provides fewer functions. The object replications may be carried out as new objects are added to a production cluster.

The replicated objects can be applied to a simplified test cluster in order to replicate a configuration of the production cluster in a scaled down form. The simplified test cluster may be used to test upgrades to the container orchestration system or supporting systems while keeping up to date with the production cluster.

Objects' definitions can be modified using a set of rules before the objects are applied to the test cluster in such a way that the syntax of an object's definition is preserved but the resource usage is reduced and actual functions provided by the full system are mocked out or simplified.

It is to be understood that the aforementioned advantages are example advantages and should not be construed as limiting. Embodiments of the present disclosure can contain all, some, or none of the aforementioned advantages while remaining within the spirit and scope of the present disclosure.

Turning now to the figures, FIG. 1 is a block diagram illustrating a container orchestration system 100, according to some embodiments of the present disclosure. The container orchestration system 100 can include a production cluster 110, a test cluster 120, and an object replication system 130. The container orchestration system 100 can take the form of a cluster management system that can manage clustered groups of hosts in the form of physical or virtual machines running containers with hosts spanning across public, private, and hybrid clouds.

A cluster in the container orchestration system 100 can be a set of node machines for running containerized applications. In some embodiments, the containers are not tied to individual machines, but instead are abstracted across a cluster. The definitions of containers can also be applied to a cluster, along with other resources such as file systems, which are then run on a set of machines owned by the cluster. The cluster can abstract away the real machines from the definition of things that need to be run. The production cluster 110 can be one set of machines and the test cluster 120 can be another set of machines.

In some embodiments, the test cluster 120 is provided in the form of a simplified version of the production cluster 110, replicating the configuration of the production cluster 110 in a scaled down form. This can allow the test cluster 120 to have fewer underlying machines than the production cluster 110. The test cluster 120 can be used to test upgrades to the container orchestration system 100 or supporting systems. The test cluster 120 can be upgraded to a latest version of the container orchestration system 100 to test if the configuration deployments work on the updated system 100 without errors.

Container orchestration systems can have objects that are persistent entities in a cluster and represent the state of the cluster. Objects can have a current status and a desired state, making the cluster a declarative system, with the cluster working to ensure that the objects are in the desired states. The objects may describe which containerized applications are running, the resources available to the applications, and the policies around the applications. Most of the objects can include an object definition (also referred to herein as a specification) and an object status. The object definition can be set when the object is created, providing a description of characteristics that a resource is intended to have in order to define the object's desired state. The object status can be the current state of the object as supplied and updated by the container orchestration system.

Microservices can be deployed in containers, and a pod can be defined as a collocated group of one or more containers running on a single worker node.

The production cluster 110 is shown with example objects 111-113 of different types. In this example, a deployment object 111, a service object 112, and a persistent volume object 113 are shown. Objects may be added to the production cluster 110 as they are specified by a user via an object application programming interface (API). In some embodiments, the service object 112 can map a fixed Internet Protocol (IP) address to a logical group of pods, and the persistent volume object 113 can define provisioned storage abstractions. The deployment object 111 can be an object that represents an application running on a cluster. When a deployment object 111 is created, the object definition may be set to specify the number of replicas of the application that are required to run. If any replica instance should fail, causing a status change, the container orchestration system 100 can respond to the difference between the specification and the status to start a replacement instance.

The object replication system 130 can detect objects added to the production cluster 110 and replicate these to the test cluster 120. The illustrated test cluster 120 includes example replicated objects 121-123, which are replicas of objects 111-113, respectively. The replicated objects include a replica deployment object 121, a replica service object 122, and a replica persistent volume object 123.

The object replication system 130 can include an object detection component 131, which can detect new objects that are added to the production cluster 110 and retrieve corresponding object definitions. The object replication system 130 can also include an object transformation component 132, which can modify the object definitions. In some embodiments, these modifications can reduce the number of required resources and inject simpler processing. The object replication system 130 can also include an object application component 133, which can create the modified object definitions in the test cluster 120. Replicated objects having the modified definitions can thus be applied to the test cluster 120.

The replicated objects 121-123 transformed by the object transformation component 132 may be simpler and require fewer resources than the objects 111-113 in the production cluster 110 and, therefore, may not directly reproduce the production function. The object transformation component 132 may modify the configuration using a set of rules, and the transformation may be dependent on the type of object. In some embodiments, each modified object 121-123 can be applied to the test cluster 120 in such a way that the syntax of the configurations is preserved while the resource usage and/or actual function(s) provided by the full system 100 are greatly reduced, which can allow the complexity to be kept.

The transformation can be dependent on the type of object. Deployment objects 111 are discussed in greater detail below as they run actual code and require resources, which can be mocked, to do so. Other resources could also be scaled back like persistent volumes to be as small as possible. This could be close to zero resources as the running containers are not executing the real production code and, thus, may not need any actual space.

Figure 2:
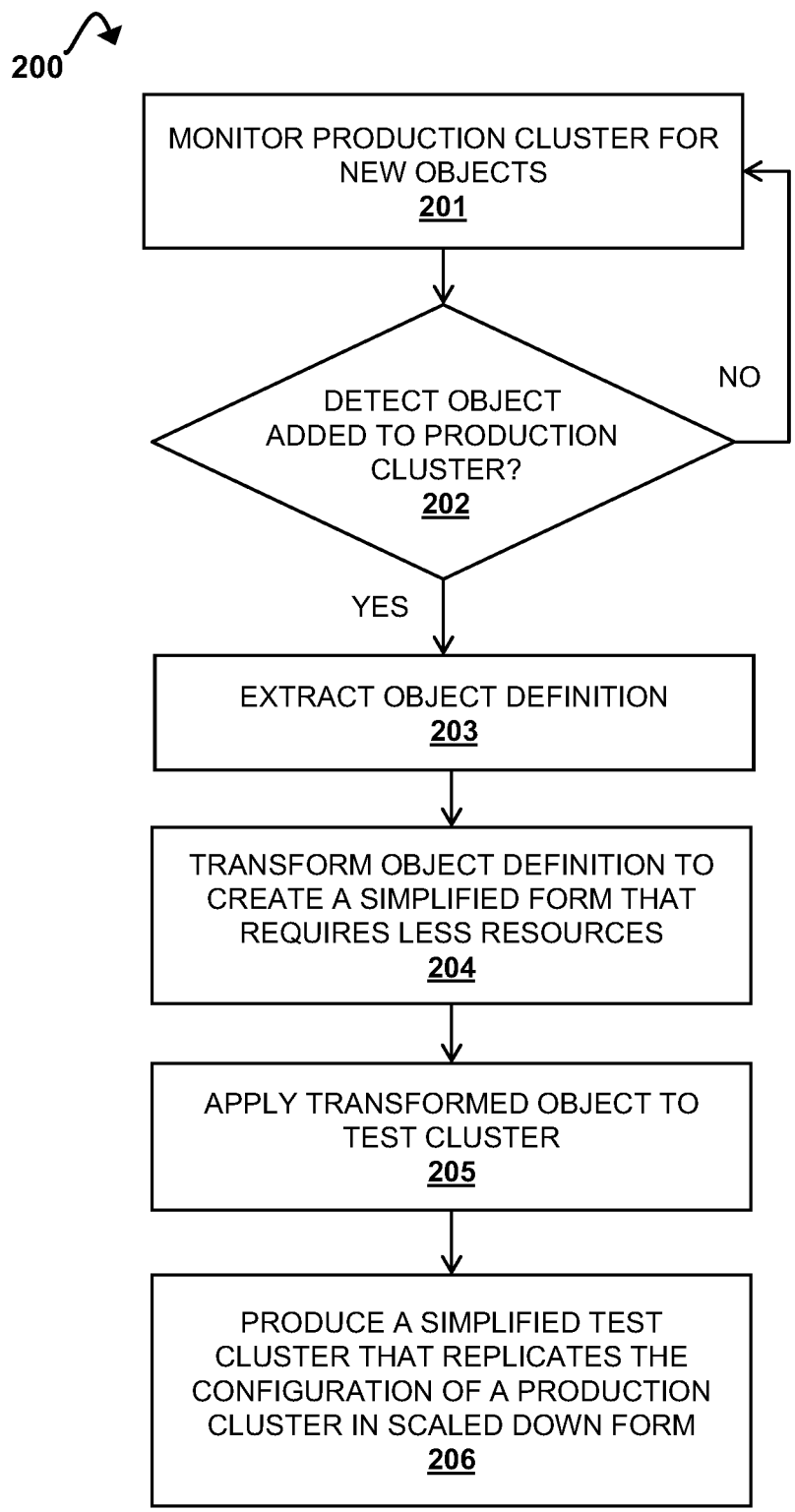
FIG. 2 is a flow diagram illustrating a process for generating a simplified test cluster, according to some embodiments of the present disclosure.

FIG. 2 is a flow diagram illustrating a process 200 of generating a simplified test cluster, according to some embodiments of the present disclosure. To illustrate process 200, but not to limit embodiments, FIG. 2 is described within the context of the container orchestration system 100 of FIG. 1. Where elements referred to in FIG. 2 are identical to elements shown in FIG. 1, the same reference numbers are used in both figures.

At operation 201, the production cluster 110 can be monitored for new objects that are added. At operation 202, it can be determined whether a new object has been added to the production cluster 110 at operation 201. If a new object has not been added, process 200 may return to operation 201 and continue monitoring the production cluster 110 for new objects.

If a new object is detected at operation 202, process 200 can proceed to operation 203, wherein the object definition is extracted for the new object. At operation 204, the extracted object definition can be modified to generate a form that requires fewer resources and provides less actual functionality (e.g., includes fewer functions) while preserving the syntax of the original object definition extracted at operation 203.

At operation 205, the transformed object definitions can be applied to the test cluster 120. By making these changes to the replicated test cluster 120, a simplified test cluster 120 can be generated at operation 206. In some embodiments, the simplified test cluster does not replicate the production system function, but does replicate the configuration used by the container orchestration system 100 in a scaled down form.

At any point in process 200, the test cluster 120 may be upgraded to a latest version of the container orchestration system 100 to test if the configuration deployments work on the updated system without any errors.

Figure 3:
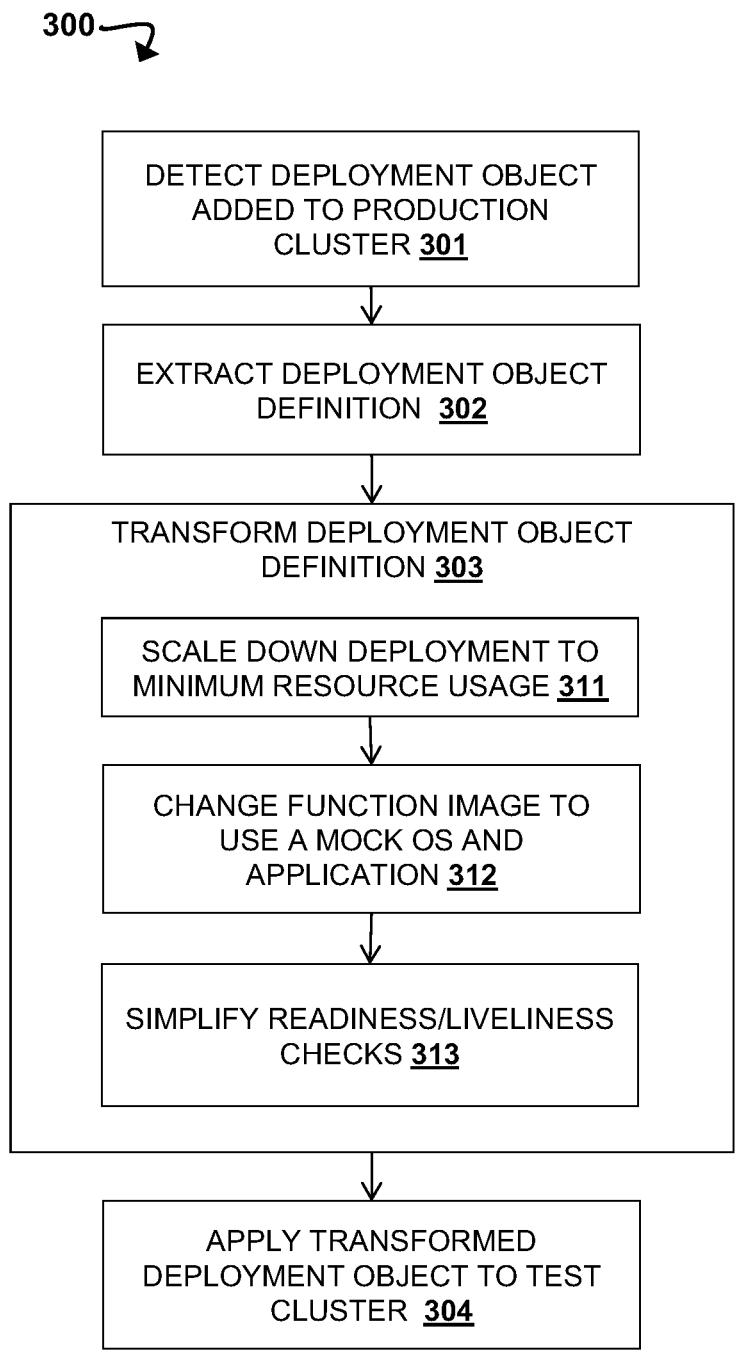
FIG. 3 is a flow diagram illustrating a process involving a new object in the form of a deployment object, according to some embodiments of the present disclosure.

FIG. 3 is a flow diagram illustrating a process 300 involving a new object in the form of a deployment object 111, according to some embodiments of the present disclosure. To illustrate process 300, but not to limit embodiments, FIG. 3 is described within the context of the container orchestration system 100 of FIG. 1. Where elements referred to in FIG. 3 are identical to elements shown in FIG. 1, the same reference numbers are used in both figures.

At operation 301, a new deployment object 111 can be added to a production cluster 110. The new deployment object 111 may then be detected. At operation 302, the deployment object definition can be extracted from the new deployment object 111. Deployment objects 111 run actual code and, therefore, require resources. At operation 303, the deployment object definition can be transformed to generate a form that requires fewer resources and provides less actual functionality while preserving the syntax of the original deployment object definition extracted at operation 302. In some embodiments, operation 303 uses operations 311-313 to transform the deployment object definition.

At operation 311, a deployment can be scaled down to minimum resource usage. This may be achieved by scaling back resources to minimal values using various techniques. For example, scaling down may include using one replicated object. Scaling down may also include reducing to a minimum the resource usage of memory, central processing unit (CPU), etc. For example, the minimum usage may be a minimum required to start a pod or container.

At operation 312, a deployment image may be changed to use a simple mock operating system (OS) and application. There may be a default mock image that includes a minimal operating system imaged with no running code. For example, the mock image for a container may include a smallest OS available and an application which is just a shell script that contains a very long sleep. There may also be alternative images to run selective aspects of the container in order to check configuration. The alternative images can be configurable by a user to test selected functionality. In some embodiments, there is an option for a user to provide their own simple image, which can have some function if required.

At operation 313, readiness and liveliness checks may also be simplified to cope with the other changes to the deployment object. In the simplest case, these checks may be removed. However, if the mock image selected at operation 312 has a mechanism to check readiness and/or liveliness, these checks may be included. At operation 304, the transformed deployment object of operation 303 can be applied to the test cluster 120.

As an example, the object definition of a deployment type object 111 in a production cluster 110 may be:

```
------------
kind: Deployment
apiVersion: extensions/v1beta1
metadata:
    name: server1-deployment
spec:
    replicas: 3
    template:
        spec:
            containers:
                - name: server1
                  image: server1:1.7.9
                  resources:
                  limits:
                      cpu: 250m
                      memory: 512M
                  requests:
                      cpu: 250m
                      memory: 512M
------------
```

For the same deployment type object in a test cluster (e.g., the replica deployment object 121 in test cluster 120), the transformed object definition may be:

```
         ------------
         kind: Deployment
         apiVersion: extensions/v1beta1
         metadata:
            name: server1-deployment
         spec:
            replicas: 1
            template:
               spec:
                  containers:
                     - name: server1
                       image: server1_mock:1.7.9
                       resources:
                          limits:
                             cpu: 25m
                             memory: 51M
                          requests:
                             cpu: 25m
                             memory: 51M
```

The rules applied to the deployment type object definition above to affect the transformation may be:
  reduce replica to 1;
  change image from real image to a mock version, if a mock version exists, and add "mock" to the image name;
  reduce memory and cpu to values that the mock image can support.

Figure 4:
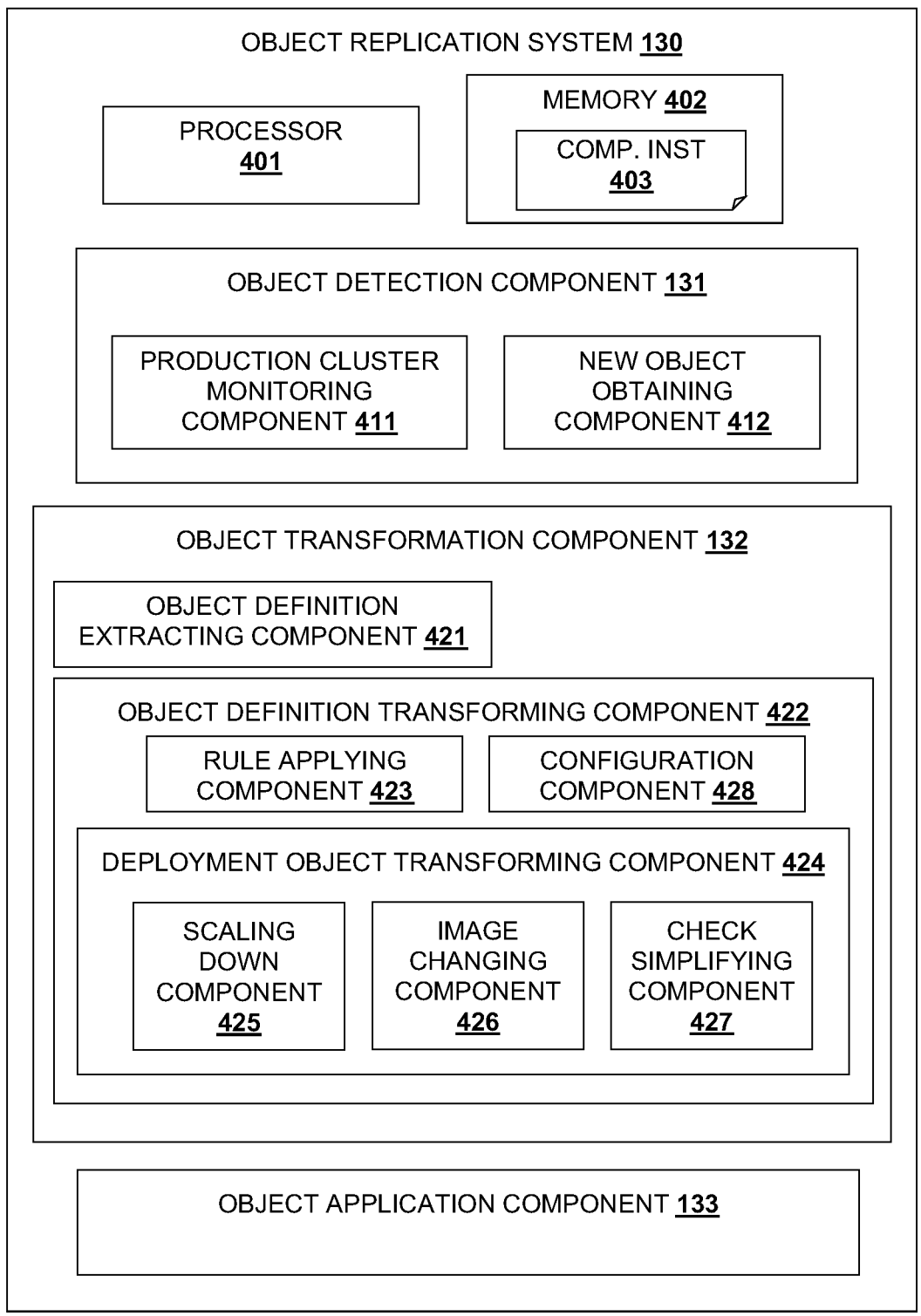
FIG. 4 is a block diagram illustrating components of an object replication system, according to some embodiments of the present disclosure.

FIG. 4 is a block diagram illustrating components of an object replication system 130, according to some embodiments of the present disclosure. To illustrate the object replication system 130, but not to limit embodiments, FIG. 4 is described within the context of the container orchestration system 100 of FIG. 1. Where elements referred to in FIG. 4 are identical to elements shown in FIG. 1, the same reference numbers are used in both figures.

The object replication system 130 may include at least one processor 401, a hardware module, or a circuit for executing the functions of the described components which may be software units executing on the processor(s). Multiple processors running parallel processing threads may be provided, enabling parallel processing of some or all of the functions of the components. The object replication system 130 can also include a memory 402. Memory 402 may be configured to provide computer instructions 403 to the at least one processor 401 to carry out the functionality of the components.

The object replication system 130 can include an object detection component 131 for detecting a new object in a production cluster 110 (FIG. 1). The object detection component 131 can include a production cluster monitoring component 411 for monitoring the production cluster 110 for new objects that are added. Additionally, the object detection component 131 can include a new object obtaining component 412.

The object replication system 130 can include an object transformation component 132 for replicating objects of a production cluster 110 by extracting an object definition from an object and transforming the object definition to create a replicated object definition with an equivalent syntactic form that can require fewer resources and/or provide less function. The object transformation component 132 can include an object definition extracting component 421 for extracting an object definition from a new object and an object definition transforming component 422 for transforming the object definition to create a replicated object definition. The object definition transforming component 422 can include a rule applying component 423 for applying rules to transform different object types and a configuration component 428 for configuring the rules.

As an example for deployment objects (e.g., deployment object 111 illustrated in FIG. 1), the object definition transforming component 422 may include a deployment object transformation component 424 that includes a scaling down component 425 for scaling down the deployment to one replica and/or minimal resource usage to start a pod or a container. The object definition transforming component 422 can also include an image changing component 426 that, in some embodiments, can change a deployment image to a simple mock operating system and application with no running code and minimum resources set. In further embodiments, the image changing component 426 can change a deployment image to an alternative image that can run selective aspects of a container to check configuration. The object definition transforming component 422 can also include a check simplifying component 427 for simplifying checks such as readiness and/or liveliness checks.

The object replication system 130 can also include an object application component 133 for applying the replicated objects to a simplified test cluster 120 (FIG. 1) that can replicate a configuration of the production cluster 110 in a scaled down form, wherein the simplified test cluster 120 can be used to test upgrades to the container orchestration system 100 or supporting systems.

In some embodiments, a production cluster 110 can be replicated to a test cluster 120 where the entire configuration for production is replicated in the test system. This may be used to configure the test cluster 120 when the production cluster 110 is modified. Alternatively, a one-off copy of all the production configuration may be applied to the test cluster 120. Replicating production clusters can be challenging because production clusters may be very large and may require vast amounts of resources to produce an identical replica. In these instances, running pods may not function correctly in a replicated cluster or may interfere with production in the case of, for instance, a database.

In some embodiments, a production cluster 110 can be duplicated in order to rapidly test container orchestration infrastructures as a whole, either on a new version or with new resources being added, without the need for individual software applications to be running and properly set up. This can be achieved by abstracting the objects out. This may reduce the time and expense to test breaking changes and version upgrades and may remove the risk of disruption to developers.

Further, this may allow users to gain the full complexity of a production cluster 110 with little effort and apply changes to production with more confidence. Because fake pods can be brought up in real pods' places, a cluster may be duplicated without resulting in side effects such as applications making changes in a production database from the test cluster. This can allow each interconnected resource definition to be created and the pods to pass their readiness checks.

By making these changes to a replicated test cluster 120, a simplified test cluster 120 can be produced that does not replicate the production system function but does replicate the configuration used by the orchestration system 100 in a scaled down form. In some embodiments, this allows upgrades to the container orchestration system 100 and supporting software to be tested in such a way that issues with orchestration configuration may be found before modifying the real production cluster 110. For example, issues related to breaking configuration changes when moving between versions may be found.

Figure 5:
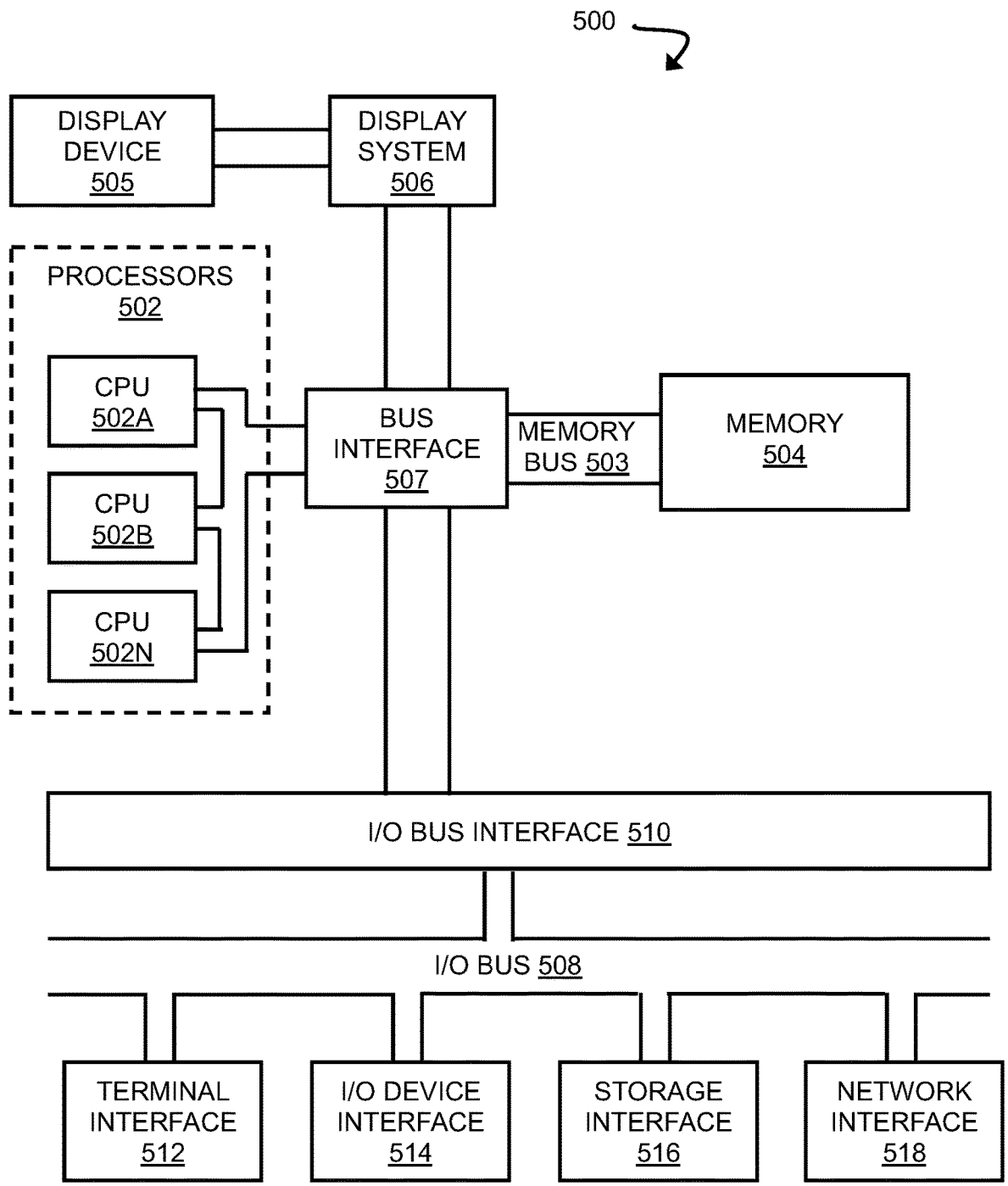
FIG. 5 is a block diagram illustrating a computer system, according to some embodiments of the present disclosure.

FIG. 5 is a block diagram illustrating an exemplary computer system 500 that can be used in implementing one or more of the methods, tools, components, and any related functions described herein (e.g., using one or more processor circuits or computer processors of the computer). In some embodiments, the major components of the computer system 500 comprise one or more processors 502, a memory subsystem 504, a terminal interface 512, a storage interface 516, an input/output device interface 514, and a network interface 518, all of which can be communicatively coupled, directly or indirectly, for inter-component communication via a memory bus 503, an input/output bus 508, bus interface unit 507, and an input/output bus interface unit 510.

The computer system 500 contains one or more general-purpose programmable central processing units (CPUs) 502A, 502B, and 502N, herein collectively referred to as the CPU 502. In some embodiments, the computer system 500 contains multiple processors typical of a relatively large system; however, in other embodiments the computer system 500 can alternatively be a single CPU system. Each CPU 502 may execute instructions stored in the memory subsystem 504 and can include one or more levels of on-board cache.

The memory 504 can include a random-access semiconductor memory, storage device, or storage medium (either volatile or non-volatile) for storing or encoding data and programs. In some embodiments, the memory 504 represents the entire virtual memory of the computer system 500 and may also include the virtual memory of other computer systems coupled to the computer system 500 or connected via a network. The memory 504 is conceptually a single monolithic entity, but in other embodiments the memory 504 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory can be further distributed and associated with different CPUs or sets of CPUs, as is known in any of various so-called non-uniform memory access (NUMA) computer architectures.

The container orchestration system 100 and components thereof (FIGS. 1 and 4) may be included in the memory 504. However, in other embodiments, some or all of these components may be on different computer systems and may be accessed remotely, e.g., via a network. The computer system 500 may use virtual addressing mechanisms that allow the programs of the computer system 500 to behave as if they only have access to a large, single storage entity instead of access to multiple, smaller storage entities. Thus, components of the memory 504 are not necessarily all completely contained in the same storage device at the same time. Further, although these components are illustrated as being separate entities, in other embodiments some of these components, portions of some of these components, or all of these components may be packaged together.

In some embodiments, the container orchestration system 100 includes instructions that execute on the processor 502 or instructions that are interpreted by instructions that execute on the processor 502 to carry out the functions as further described in this disclosure. In another embodiment, the container orchestration system 100 is implemented in hardware via semiconductor devices, chips, logical gates, circuits, circuit cards, and/or other physical hardware devices in lieu of, or in addition to, a processor-based system. In another embodiment, the container orchestration system 100 includes data in addition to instructions.

Although the memory bus 503 is shown in FIG. 5 as a single bus structure providing a direct communication path among the CPUs 502, the memory subsystem 504, the display system 506, the bus interface 507, and the input/output bus interface 510, the memory bus 503 can, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the input/output bus interface 510 and the input/output bus 508 are shown as single respective units, the computer system 500 may, in some embodiments, contain multiple input/output bus interface units 510, multiple input/output buses 508, or both. Further, while multiple input/output interface units are shown, which separate the input/output bus 508 from various communications paths running to the various input/output devices, in other embodiments some or all of the input/output devices may be connected directly to one or more system input/output buses.

The computer system 500 may include a bus interface unit 507 to handle communications among the processor 502, the memory 504, a display system 506, and the input/output bus interface unit 510. The input/output bus interface unit 510 may be coupled with the input/output bus 508 for transferring data to and from the various input/output units. The input/output bus interface unit 510 communicates with multiple input/output interface units 512, 514, 516, and 518, which are also known as input/output processors (IOPs) or input/output adapters (IOAs), through the input/output bus 508. The display system 506 may include a display controller. The display controller may provide visual, audio, or both types of data to a display device 505. The display system 506 may be coupled with a display device 505, such as a standalone display screen, computer monitor, television, or a tablet or handheld device display. In alternate embodiments, one or more of the functions provided by the display system 506 may be on board a processor 502 integrated circuit. In addition, one or more of the functions provided by the bus interface unit 507 may be on board a processor 502 integrated circuit.

In some embodiments, the computer system 500 is a multi-user mainframe computer system, a single-user system, or a server computer or similar device that has little or no direct user interface but receives requests from other computer systems (clients). Further, in some embodiments, the computer system 500 is implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 500. In some embodiments, however, individual components may have greater or lesser complexity than as represented in FIG. 5, Components other than or in addition to those shown in FIG. 5 may be present, and the number, type, and configuration of such components may vary.

In some embodiments, the data storage and retrieval processes described herein could be implemented in a cloud computing environment, which is described below with respect to FIGS. 6 and 7.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher-level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
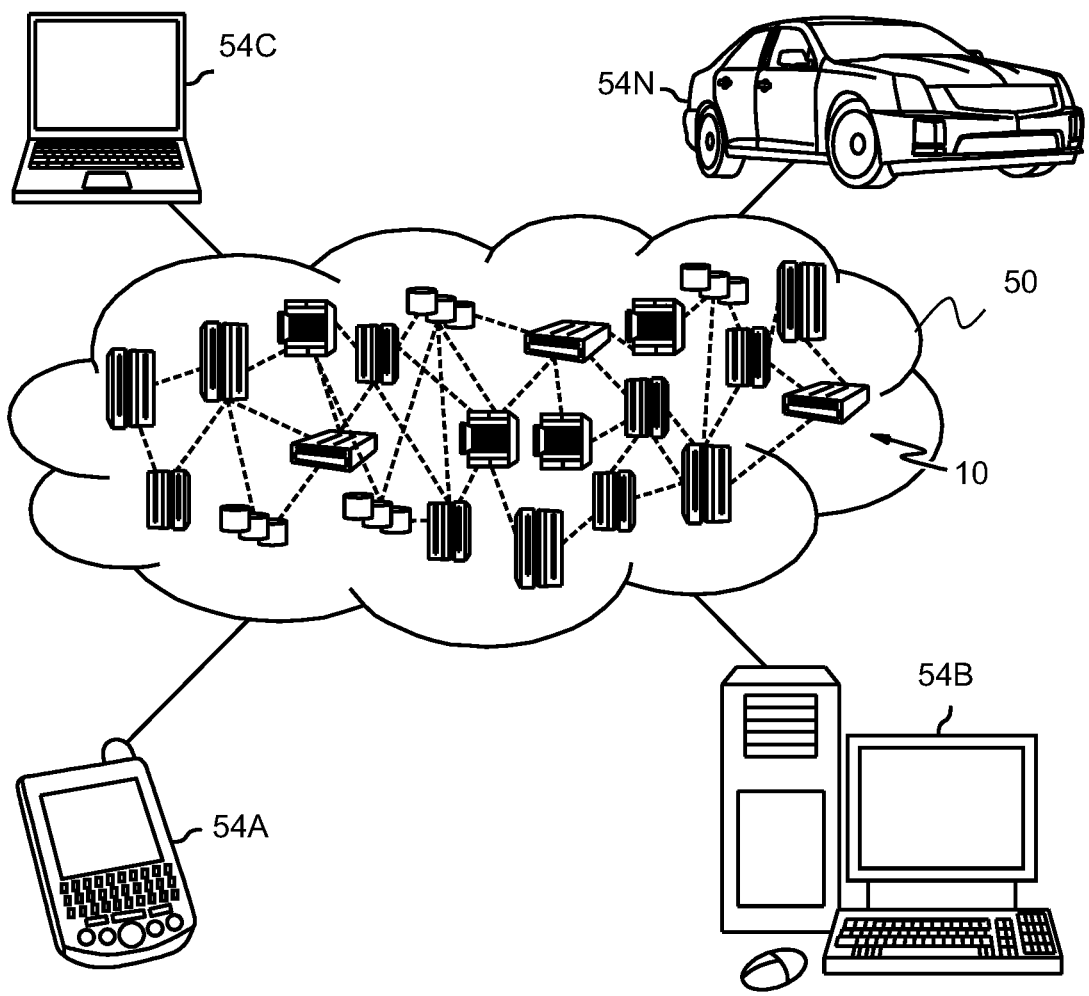
FIG. 6 is a block diagram illustrating a cloud computing environment, according to some embodiments of the present disclosure.

FIG. 6 is a block diagram illustrating a cloud computing environment 50, according to some embodiments of the present disclosure. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 6 are intended to be illustrative only and that computing nodes 10 and cloud computing environment 50 can communicate with any type of computerized device over any type of network and/or network addressable connection (e.g., using a web browser).

Figure 7:
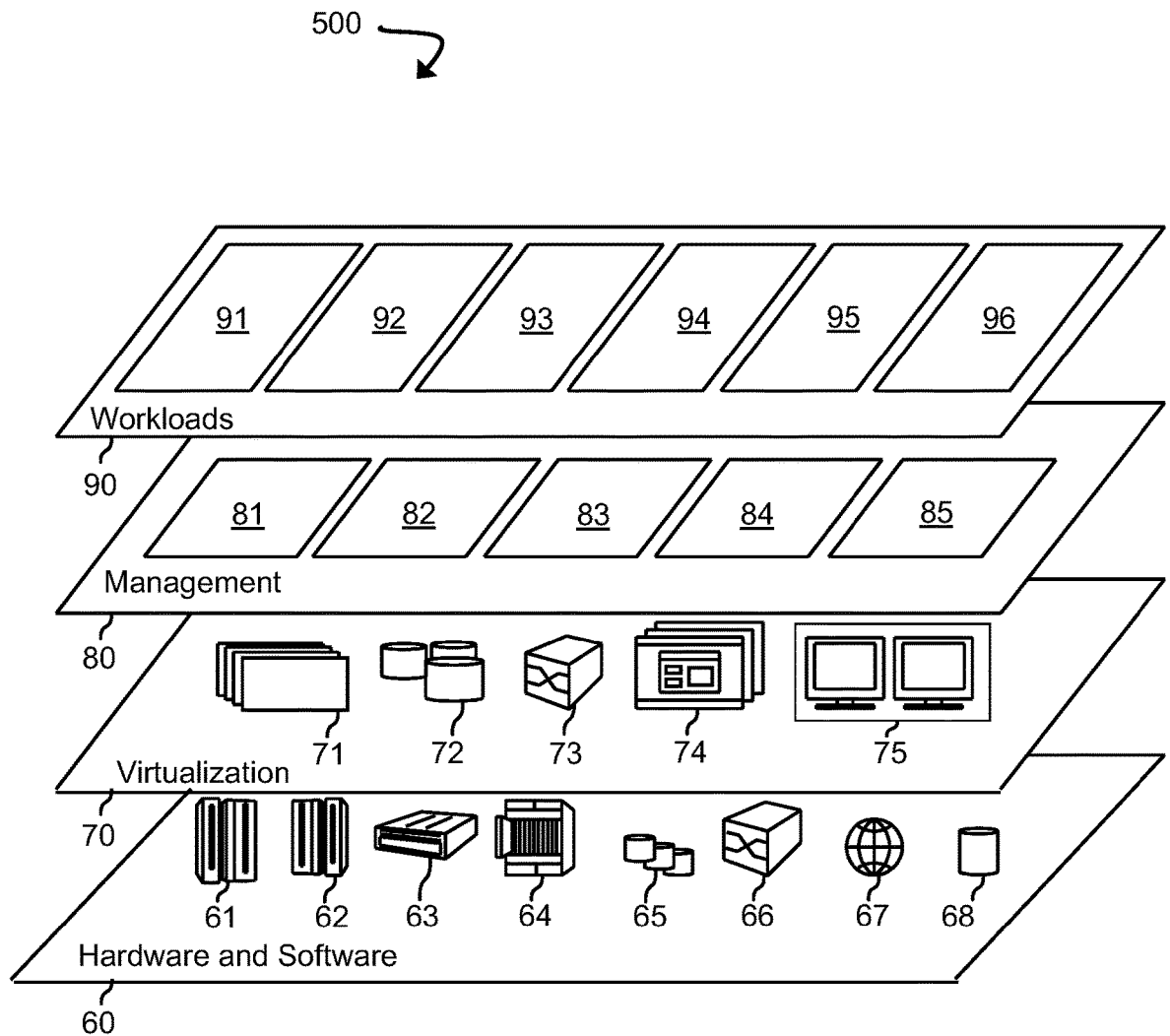
FIG. 7 is a block diagram illustrating abstraction model layers, according to some embodiments of the present disclosure.

FIG. 7 is a block diagram illustrating a set of functional abstraction layers provided by cloud computing environment 50 (FIG. 6), according to some embodiments of the present disclosure. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions that can be provided from this layer include: mapping and navigation 91; software development and lifecycle management 92; virtual classroom education delivery 93; data analytics processing 94; transaction processing 95; and container orchestration system object processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the present disclosure.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof.

In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. However, the various embodiments may be practiced without these specific details. In other instances, well-known circuits, structures, and techniques have not been shown in detail in order not to obscure embodiments.

When different reference numbers comprise a common number followed by differing letters (e.g., 100A, 100B, 100C, 100N) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, and item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; ten of item C; four of item B and seven of item C; or other suitable combinations.

What is claimed is:

1. A method of testing a container orchestration system, comprising:
   replicating objects of a production cluster, wherein the replicating comprises:
   extracting an object definition from an object; and
   transforming the object definition to create a replicated object definition with an equivalent syntactic form, wherein the replicated object definition requires fewer resources than the object definition;
   applying the replicated objects of the production cluster to a simplified test cluster that replicates a configuration of the production cluster in a scaled down form; and
   testing, with the simplified test cluster, an upgraded version of the container orchestration system.

2. The method of claim 1, further comprising:
   detecting a new object in the production cluster;
   extracting a new object definition from the new object;
   transforming the new object definition to create a new replicated object definition; and
   applying a new replicated object having the new replicated object definition to the simplified test cluster.

3. The method of claim 2, further comprising monitoring the production cluster for new objects.

4. The method of claim 1, wherein the transforming the object definition comprises modifying the object definition using a set of rules that depend on an object type.

5. The method of claim 1, wherein the transforming the object definition comprises scaling back required resources to minimum values required for operation of the object.

6. The method of claim 1, wherein the object is a deployment object and wherein the transforming the object definition comprises scaling down a deployment to one replica.

7. The method of claim 1, wherein the object is a deployment object and wherein the transforming the object definition comprises changing a deployment image to a simple mock operating system and application with no running code and minimum resources.

8. The method of claim 1, wherein the object is a deployment object and wherein the transforming the object definition comprises changing a deployment image to an alternative image for running selective aspects of a container to check configuration.

9. The method of claim 8, wherein the alternative image is configurable by a user to test selected functionality.

10. The method of claim 1, wherein the object is a deployment object and wherein the transforming the object definition comprises simplifying checks.

11. A system for testing a container orchestration system, comprising:
a memory; and
a processor communicatively coupled to the memory, wherein the processor is configured to perform a method, the method comprising:
replicating objects of a production cluster, wherein the replicating comprises:
extracting an object definition from an object; and
transforming the object definition to create a replicated object definition with an equivalent syntactic form, wherein the replicated object definition requires fewer resources than the object definition;
applying the replicated objects of the production cluster to a simplified test cluster that replicates a configuration of the production cluster in a scaled down form; and
testing, with the simplified test cluster, an upgraded version of the container orchestration system.

12. The system of claim 11, wherein the method further comprises:
detecting a new object in the production cluster;
extracting a new object definition from the new object;
transforming the new object definition to create a new replicated object definition; and
applying a replicated object having the new replicated object definition to the simplified test cluster.

13. The system of claim 12, wherein the method further comprises monitoring the production cluster for new objects.

14. The system of claim 11, wherein the transforming the object definition comprises modifying the object definition using a set of rules that depend on an object type.

15. The system of claim 11, wherein the transforming the object definition comprises scaling back required resources to minimum values required for operation of the object.

16. The system of claim 11, wherein the object is a deployment object and wherein the transforming the object definition comprises scaling down a deployment to one replica.

17. The system of claim 11, wherein the object is a deployment object and wherein the transforming the object definition comprises changing a deployment image to an alternative image for running selective aspects of a container to check configuration.

18. The system of claim 17, wherein the alternative image is configurable by a user to test selected functionality.

19. The system of claim 11, wherein the object is a deployment object and wherein the transforming the object definition comprises simplifying checks.

20. A computer program product for testing a container orchestration system, the computer program product comprising a non-transitory computer readable storage medium having program instructions embodied therewith, the program instructions executable by a processor to cause a device to perform a method, the method comprising:
replicating objects of a production cluster, wherein the replicating comprises:
extracting an object definition from an object; and
transforming the object definition to create a replicated object definition with an equivalent syntactic form, wherein the replicated object definition requires fewer resources than the object definition;
applying the replicated objects of the production cluster to a simplified test cluster that replicates a configuration of the production cluster in a scaled down form; and
testing, with the simplified test cluster, an upgraded version of the container orchestration system.

* * * * *